J. S. HENSEL.
TRACTION LUG.
APPLICATION FILED APR. 25, 1919.
1,327,867.
Patented Jan. 13, 1920.
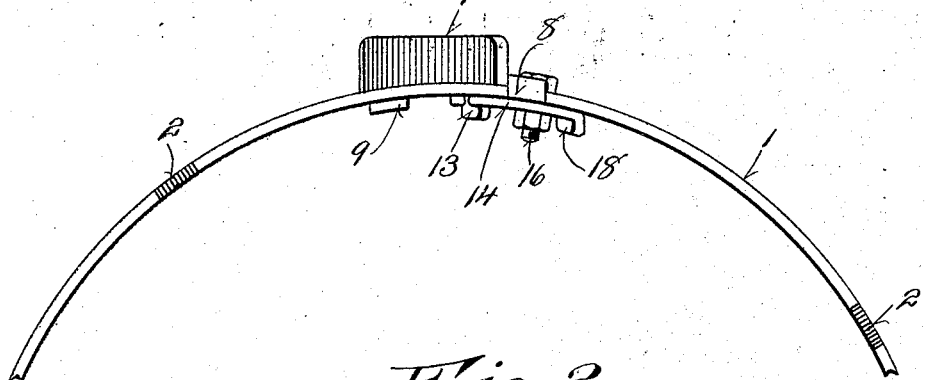
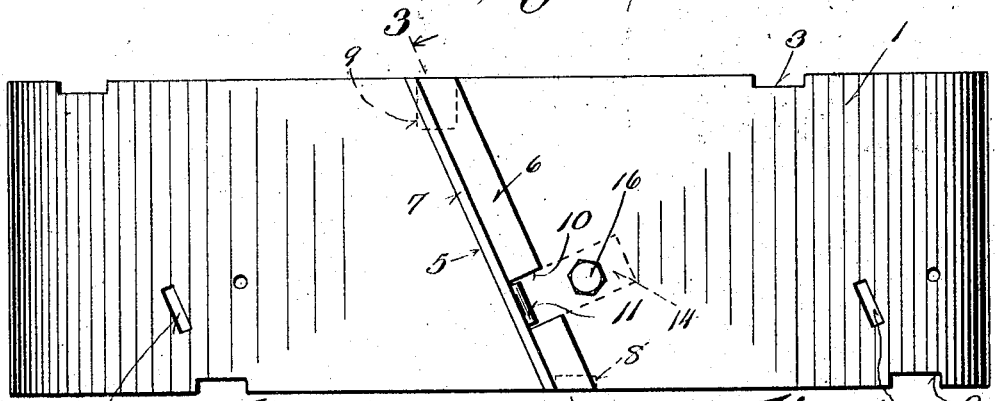
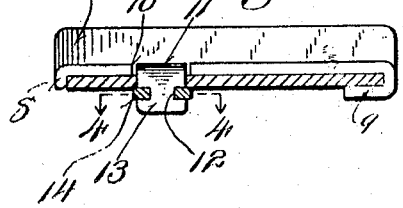
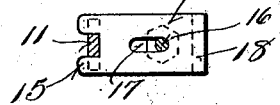
WITNESS
T. F. Britt
INVENTOR
John S. Hensel
BY
Young & Young
ATTORNEYS

UNITED STATES PATENT OFFICE.

JOHN S. HENSEL, OF STEVENS POINT, WISCONSIN.

TRACTION-LUG.

1,327,867.   Specification of Letters Patent.   Patented Jan. 13, 1920.

Application filed April 25, 1919. Serial No. 292,700.

*To all whom it may concern:*

Be it known that I, JOHN S. HENSEL, a citizen of the United States, and resident of Stevens Point, in the county of Portage and State of Wisconsin, have invented certain new and useful Improvements in Traction-Lugs; and I do hereby declare that the following is a full, clear, and exact description thereof.

This invention pertains to new and useful improvements in road gripping devices for tractor wheels and the wheels of motor-driven vehicles.

Under certain conditions some sort of ground engaging gripping means is absolutely necessary for tractor wheels and the like to procure traction, while at other times, for instance when the machine is traveling over a hard road surface, any supplemental traction devices are unnecessary. Therefore my invention is designed primarily for easy and quick attachment to or detachment from a tractor wheel.

An additional object of the invention is to provide a traction device which can be inexpensively manufactured from ordinary stock angle bars.

A still further object is to increase the efficiency and otherwise improve the structure of devices of this character.

With these general objects in view, the invention resides more particularly in the novel combination, arrangement and formation of parts which will be hereinafter described and claimed.

In the accompanying drawing:

Figure 1 represents a side elevational view of a portion of a tractor wheel having one of my improved lugs or calks secured thereon.

Fig. 2 is a plan view of the parts shown in Fig. 1.

Fig. 3 is a view taken substantially transversely of the wheel rim on the plane of the line 3—3 of Fig. 2, and Fig. 4 is a detail sectional view taken substantially on the plane of the line 4—4 of Fig. 3.

It is to be understood that in the application of this invention, a single one of the traction devices may be used if sufficient gripping can be obtained thereby, or a plurality may be used and spaced equal distances about the wheel rim. Likewise the individual members may be cast or formed as shown in the present application of short sections of stock angle bars. Various other minor changes may be made in the construction, and in the form and proportion of the invention without departing from or sacrificing any of the features thereof.

In the illustrated embodiment of my invention the same is mounted upon a portion of a tractor wheel 1, and since each of the ground engaging devices are similar, the description of the construction and use of one will be sufficient. In preparing the wheel rim 1 for the reception of a traction device or calk, the opposite edges thereof are provided with notches 3 and 2, the first named notch being somewhat in advance of the notch 2. The intermediate portion of the rim in a diagonal plane connecting similar ends of the notches, is provided with an opening 4.

As hereinbefore mentioned the calk 5 is in the form of an angle bar, the flange 6 of which is adapted to lie in flush engagement with the outer face of the wheel rim, the other flange 7 forming the road gripping element of the device. When disposed on the wheel rim the bar is positioned at a slight angle as shown in Fig. 2.

The ends of the flange 6 extend beyond the adjacent ends of the other flange 7, and one is bent laterally in a direction opposite to the extension of the flange 7 to provide a lug 8 for coöperation with said notch 2. The opposite end of the flange 6 extends a greater distance beyond the flange 7 than the last mentioned end of the former and is bent into hook-shape as at 9. The bight of the hook is engaged in said notch 3, the free end portion thereof being in contact with the inner surface of the wheel rim 1.

The intermediate portion of the flange 6 is provided with transverse cuts 10, the material between which is bent laterally in the same direction as the lug 8 to form an attaching arm 11. This arm is extended through the opening 4 and has its opposite sides notched as at 12 to provide a head 13.

The notches 12 and the consequent head 13 form one element of a lock, the other element of which consists of a sliding latch plate 14 having one end bifurcated, the furcations 15 thereof being disposable in said notches 12. The latch plate is carried by the wheel rim 1, it being slidably secured to the inner surface thereof by means of a bolt or the like 16, said plate having a slot 17 receiving the same. The end of the plate opposite the furcations 15 is bent laterally to construct a finger piece 18 whereby this lock element is readily shiftable.

In attaching the angle strip to the surface of the wheel rim 1, the hook 9 is engaged with one edge and located in said notch 3, the other end of the bar being slightly elevated with respect to the rim. Upon the positioning of the hook 9 in the notch 3, this raised end of the bar may be lowered to allow the attaching arm 11 to be projected through the opening 4, and the lug 8 seated in the notch 2. Now when the latch plate 14 is shifted to engage the furcations 15 with the notches 12, the traction device or calk will be secured against movement in any direction with respect to the outer surface of the rim 1.

I claim:

1. The combination with a wheel rim having an opening intermediate its edges, of a traction device comprising an angle bar disposed substantially transversely of the rim and having one flange in substantially flush engagement with the face of the latter, the other flange being extended approximately at right angles to the rim, the first mentioned flange intermediate its ends being provided with a pair of transverse slits, the material of the flange between said slits being bent in a direction opposite the second mentioned flange to provide an attaching arm, said arm being disposed through said wheel rim opening, and means on the inside of said rim for detachable engagement with said arm.

2. The combination with a wheel rim having a notch in each edge and an opening intermediate said notches, of a traction device comprising a ground engaging member positioned substantially transversely of the rim, a lug on each end portion of the member and disposed in said notches, an arm extended from the intermediate portion of the member and disposed through said opening, and means for detachable engagement with said arm to hold the member engaged with the rim.

3. The combination with a wheel rim having a notch in one edge, of a traction device comprising a ground engaging member positioned substantially transversely of the rim, a hook formed on one end of the member to engage one edge of the rim, a lug on the other end of the member to seat in said notch, and means for securing the intermediate portion of the member to the rim.

In testimony that I claim the foregoing I have hereunto set my hand at Stevens Point, in the county of Portage and State of Wisconsin.

JOHN S. HENSEL.